United States Patent

Russo et al.

[11] Patent Number: 6,072,848
[45] Date of Patent: Jun. 6, 2000

[54] METHOD AND APPARATUS FOR CONSTRUCTING A DIGITAL PHASE DIFFERENTIATOR INCORPORATING A DYNAMIC DECREMENT COUNTER

[75] Inventors: David W. Russo, Woodinville, Wash.; Gus Vos, Delta, Canada

[73] Assignee: Motorola, Inc., Schaumburg, Ill.

[21] Appl. No.: 08/980,936

[22] Filed: Dec. 1, 1997

[51] Int. Cl.[7] .................................................. H03D 3/24
[52] U.S. Cl. .......................... 375/375; 326/323; 326/343
[58] Field of Search .................................... 375/324, 327, 375/328, 375, 340; 329/302, 323, 343; 331/111

[56] References Cited

U.S. PATENT DOCUMENTS 4,286,223  8/1981  Shearer .................................. 329/343
4,656,431  4/1987  Chapman ............................... 329/323
5,469,112  11/1995  Lee ......................................... 329/302
5,844,446  12/1998  McAllister et al. .................... 331/111

Primary Examiner—Stephen Chin
Assistant Examiner—Chieh M. Fan
Attorney, Agent, or Firm—James A. Lamb

[57] ABSTRACT

A method and apparatus for constructing a digital phase differentiator incorporating a dynamic decrement counter (30). A limited signal is sampled at a fixed sampling rate. A fixed rate for an intermediate frequency is obtained. The fixed sampling rate is divided by a divisor to obtain a frequency of a clock. The frequency of the clock is divided by the intermediate frequency to obtain an desired average divider. A set of integer load values (34, 36 and 38) is selected that on average yields a non-integer value that is close to the desired average divider. A load of the dynamic decrement counter (30) changes cyclically using the set of integer load values (34, 36 and 38) to obtain a phase of the limited signal.

10 Claims, 6 Drawing Sheets

METHOD AND APPARATUS FOR CONSTRUCTING A DIGITAL PHASE DIFFERENTIATOR INCORPORATING A DYNAMIC DECREMENT COUNTER

FIELD OF THE INVENTION

The present invention relates generally to a dynamic divider for use with a digital phase differentiator for frequency compensation.

BACKGROUND OF THE INVENTION

In general, the digital phase differentiator (DPD) is a frequency modulation (FM) demodulation method that requires a hard limited signal at an intermediate frequency as input and outputs a baseband discriminator signal. The DPD is part of an integrated digital controller ademodulation chip. The DPD receives the limited signal from a back-end receiver chip that does the intermediate frequency filtering that gives the radio the desired selectivity.

As shown in FIG. 1, the DPD is basically a detector which obtains the phase of the limited signal and a differentiator that estimates the FM demodulation process. The intermediate frequency (Fif) limited input is buffered and synchronized to the system clock Fs 10 (e.g., 16.8 MHz). The synchronized limited signal 12 is used to trigger or capture the counter 14 at a particular state. The period of the counter is setup so that it is an exact integer multiple of the Fif. Therefore, when there is no modulation on the limited signal, the synchronized limited signal will capture the same counter value at every rising edge of the limited signal. When there is modulation on the limited signal, the phase register 15 value will represent the phase of the signal. As mentioned, the period of the counter 14 must be an integer multiple of the Fif. The integer multiple used or the size of the counter 14 is determined by the occupied bandwidth of the signal. The phase signal at the phase register 15 output is then sub-sampled at some convenient rate.

The last stage of the DPD is a differentiator 17 which is approximated by a difference function. The differentiator 17 consists of a N-delay stage 16 and a modulo subtractor 18. The modulo subtractor 18 is required because the phase is modulo, wherein the term modulo means the maximum number of states for a counter. The N-delay stage 16 determines the time constant of the differentiation. This output is equivalent to a sampled discriminator. The output is then fed to a normal demodulation block for further processing of the signal to convert the signal into bits.

Due to odd sampling rates of a practical DPD system, there will be an offset between the desired input limited signal frequency (e.g., 455 KHz) and the desired Fif of the DPD. This offset causes DPD system performance degradation. The sampling rates of a DPD system are required to be integer multiples of the reference oscillator frequency and correspondingly the system clock Fs 10. Also, the Fif of the input limited signal should be restricted to standard frequencies (e.g., 455 KHz) to take advantage of the high volume parts that are already being produced.

Some examples of DPD sampling frequencies and counter periods (also called "divider"), assuming a reference oscillator frequency of 16.8 MHz and an Fif of 455 KHz, are as follows:

1. sampling at 16.8/2=8.4 MHz with a counter period of 18 yields a DPD Fif of 466.7 KHz; and
2. sampling at 16.8/3=5.6 MHz with a counter period of 12 yields a DPD Fif of 466.7 KHz.

As stated, the desired Fif of the DPD is 466.7 KHz and the desired input limited signal frequency is 455 KHz, thus there is 11.7 KHz of difference between the two signals. The frequency offset between the Fif of the DPD and the input limited signal frequency is usually unavoidable. This frequency offset causes degradation in the performance of the DPD. As a result, with an offset of 11.7 KHz, at least 1 dB of system degradation occurs which is not tolerable in a feasible DPD system.

A first solution to the magnitude of the offset problem is to use a different Fif which usually entails custom filters. A second solution to the magnitude of the offset problem is the addition of special crystals to provide the necessary reference oscillator frequency. However, such use of customized filters or special crystals increases the product cost and increases the power consumption. Alternatively, a third solution to the magnitude of the offset problem is to do nothing and live with a performance which is not acceptable.

Hence, there exists a need for a method and apparatus to allow DPD sampling frequency and counter period to yield a DPD Fif closer to the desired input limited signal frequency without increasing either the product cost or the power consumption.

BRIEF DESCRIPTION OF THE DRAWINGS

A preferred embodiment of the invention is now described, by way of example only, with reference to the accompanying drawings in which.

DETAILED DESCRIPTION OF THE PREFERRED EMBODIMENT

The present invention provides a method and apparatus for constructing a digital phase differentiator (DPD) incorporating a dynamic decrement counter to obtain a phase of a limited signal. A fixed sampling rate and a fixed intermediate frequency (Fif) rate is used by the DPD (preferably 16.8 MHz and 455 MHz, respectively). These frequencies are more desirable than other frequencies because manufactures have high volume parts at these frequencies which are cheaper and would require less customization, if any.

Figure 1:
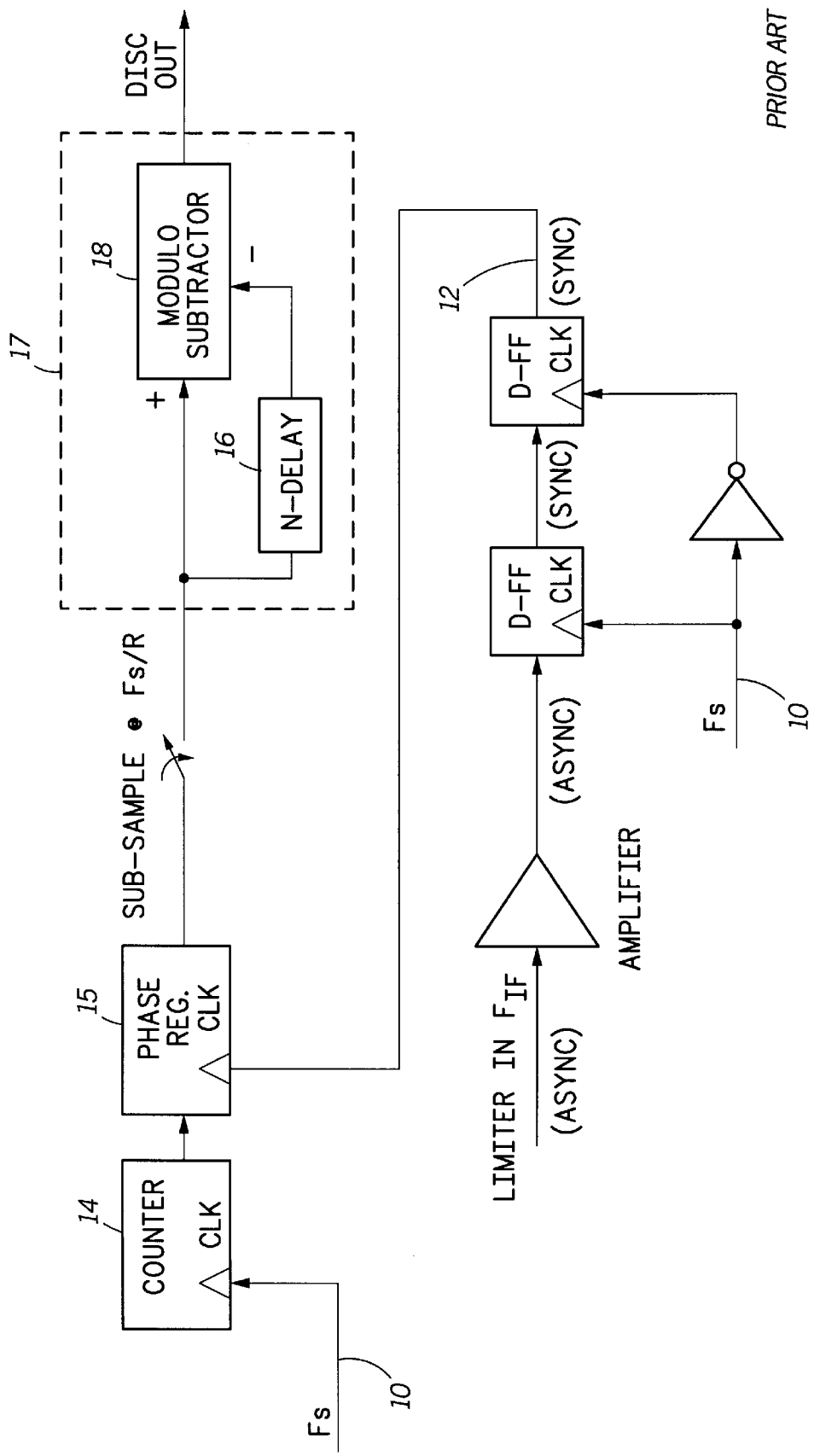
FIG. 1 (prior art) is a block diagram of a digital phase differentiator.
Figure 2:
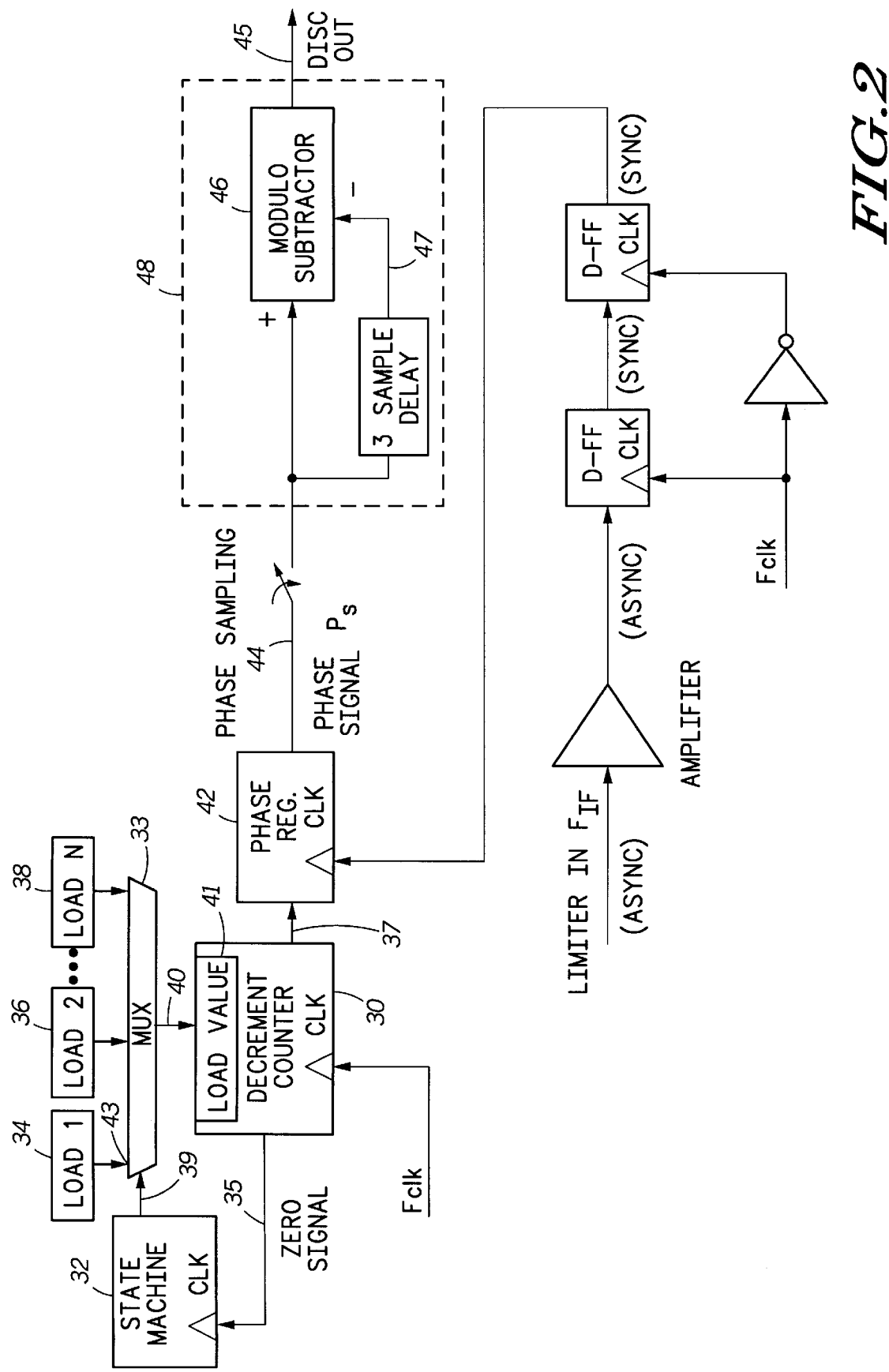
FIG. 2 is a block diagram of a digital phase differentiator with a dynamic decrement counter according to the preferred embodiment of the present invention.

FIG. 2 is a block diagram of the DPD system incorporating the dynamic decrement counter system according to the preferred embodiment of the present invention. The DPD system comprises a dynamic decrement counter 30 having a reset value input 40, a first output 35, a second output 37 and a load value 41. A multiplexer 33 is coupled to the reset value input 40 of the dynamic decrement counter 30 and utilizes a set of at least two integer load values 34 and 36. A state machine 32 is coupled to the first output 35 of the dynamic decrement counter 30. The state machine 32 has a load value output coupled to the reset value input 40 of the dynamic decrement counter 30 via the multiplexer 33. A phase register 42 is coupled to the second output 37 of the dynamic decrement counter 30. A modulo subtractor 46 is coupled to a phase signal output 44 of the phase register 42.

The present invention utilizes the dynamic decrement counter 30, as opposed to a fixed counter, in the DPD system where the load value 41 of the dynamic decrement counter 30 changes cyclically based on the state machine 32. The dynamic decrement counter 30 measures the time between transitions of a limited signal in order to obtain a phase of the limited signal. The dynamic decrement counter 30 generates a non-integer average divider value. The state machine 32 controls the next load state of the dynamic decrement counter 30. Control of the next load state by the state machine 32 is accomplished by changing the period of the dynamic decrement counter 30 every counter period cycle when the dynamic decrement counter 30 reaches zero 35. When the dynamic decrement counter 30 is at zero 35, the state machine 32 increments the dynamic decrement counter 30 to the next load state.

In operation, a limited signal is sampled at a fixed sampling rate. A fixed rate is obtained for a Fif of the limited signal. A fixed reference oscillator rate (i.e., 16.8 MHz) is divided by a divisor to obtain a frequency of a clock (Fclk). The divisor can be any arbitrary value. However, a value for the divisor should be chosen in order to generate the minimum overall power consumption. It should be appreciated that power consumption is driven by the number of logic gates that are switching and at the rate at which each logic gate changes. The more the logic gate changes states, the more power is consumed. For example, a divisor of two utilizes one flip-flop (e.g., eight logic gates, typically) clocking at the 16.8 MHz fixed rate, whereas a divisor of three utilizes two flip flops clocking at the 16.8 MHz fixed rate. Thus, the divisor is chosen empirically based on power consumption. As a result, it is desired to choose a divisor that results in the minimum number of logic gates clocking at the 16.8 MHz fixed sampling rate.

Once the frequency of the DPD's Fclk is obtained, the Fclk is divided by the Fif to obtain a desired average divider (avediv). The following formula is used to calculate the desired avediv:

$$avediv = \frac{Fclk}{Fif},$$

where Fclk is equal to the DPD sampling frequency and Fif is equal to limited signals frequency. For example, if Fclk= 16.8/3=5.6 MHz and Fif=455 KHz, the desired avediv would equal 12.307.

A set of integer load values 34, 36 and 38 is selected that on average yields a non-integer value that is close to the desired avediv. The set of integer load values consists of at least two integer numbers. For example, selecting load values of [12 13 12] will yield a close avediv value of 12.333. If Fclk=16.8/2=8.4 MHz and Fif=455 KHz, the avediv would equal 18.46 which could be easily obtained by using [18 19] as load values yielding an avediv of 18.5.

The state machine 32 cycles through the set of integer load values 34, 36 and 38 in a circular fashion. Ideally, a minimum number of load values are used to minimize the hardware and cost. By cycling through a set of integer load values 34, 36, and 38, a non-integer avediv value results. The set of integer load values 34, 36 and 38 must be exclusively integers.

A load value of the dynamic decrement counter 30 changes cyclically using the set of integer load values to eventually obtain the phase of the limited signal. Thus, the number of states that the dynamic decrement counter 30 goes through is indicative of the number of integer values chosen for the load values 34, 36 and 38 (e.g., the dynamic decrement counter 30 cycles through two states with load values [12 13]; the dynamic decrement counter 30 cycles through three states with load values [12 13 13]). The greater the resolution desired by the user, the greater the number of states (i.e., the greater number of load values) required for the dynamic decrement counter 30 to cycle through.

Thus, since the input frequency of the DPD is related to the average load value of the dynamic decrement counter 30, the divider no longer has to be an integer number and more freedom of the input Fif to the DPD can be made. The freedom of the input Fif to the DPD results in lower power consumption and lower product cost since extra and/or custom parts are not required.

As stated previously, the differentiator 48 is approximated by a difference function generated by a delayed version 47 of the phase signal 44 being modulo subtracted from the phase signal 44 thus forming a discriminated radio output 45. At first glance, it appears the phase signal Ps 44 at the phase register 42 output requires no extra resolution bits with the DPD incorporating the dynamic decrement counter 30, but this arrangement does require changes to the modulo subtractor 46. The modulo subtractor 46 insures that signal wraps around the maximum modulo number do not give rise to impulse spike when subtracted. The modulo subtractor 46 does this by adding or subtracting avediv from the result if the result is greater than the maximum modulo number. If the avediv is not used in the modulo subtractor 46, performance degradation of the DPD system will occur.

Figure 3:
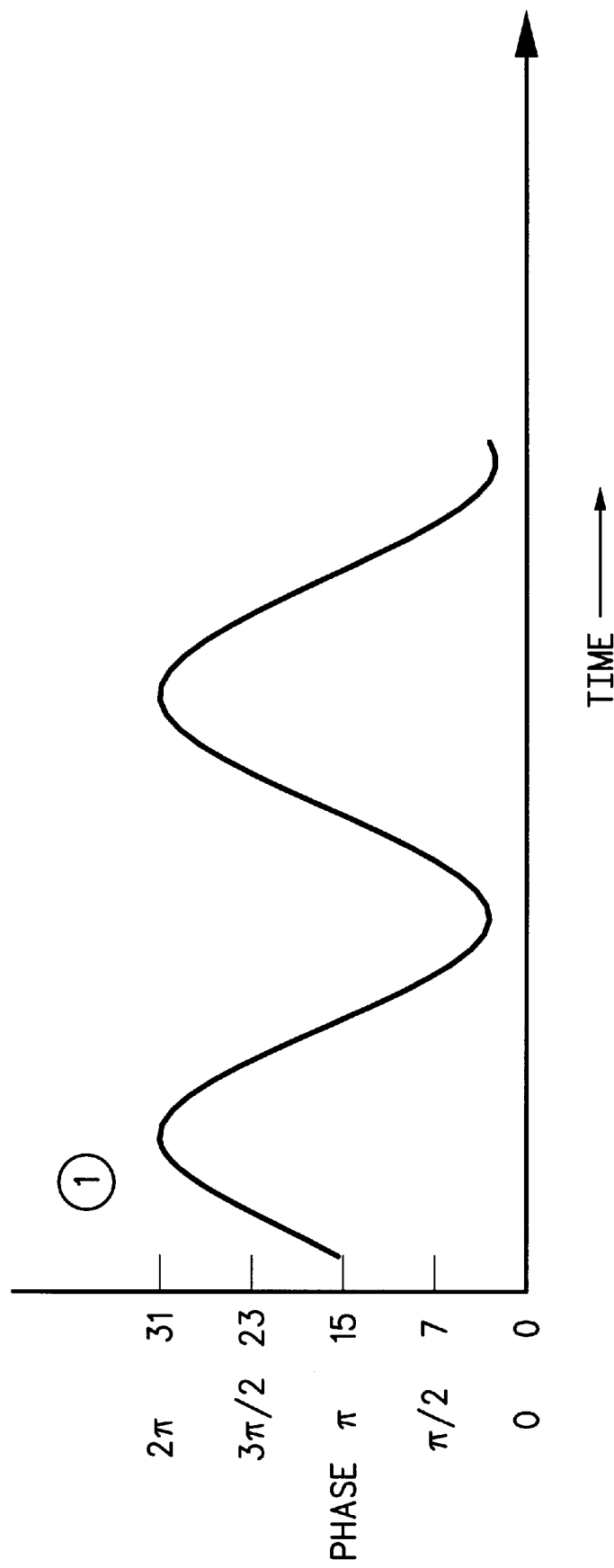
FIG. 3 graphically illustrates a first example of a signal from a modulo subtractor according to the preferred embodiment of the invention.
Figure 4:
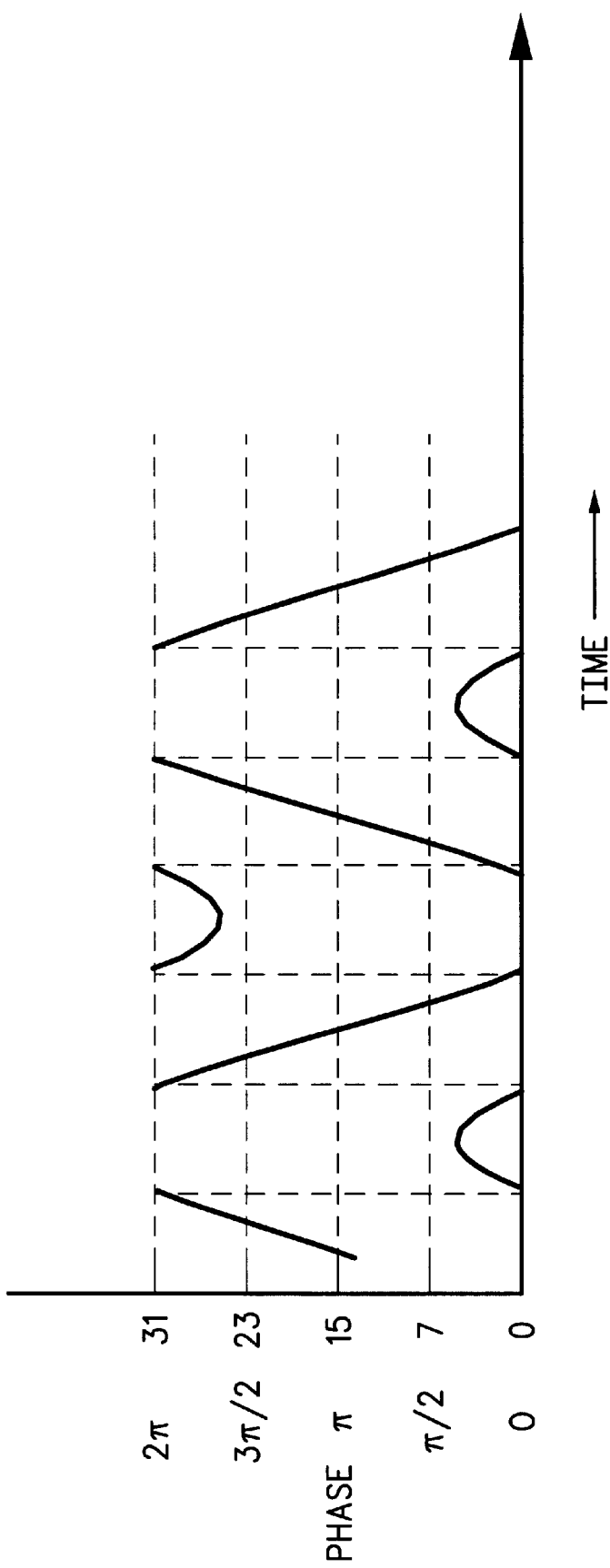
FIG. 4 graphically illustrates a wrapped signal as input to the modulo subtractor according to the preferred embodiment of the invention.

FIG. 3 illustrates an example of the operation of the modulo subtractor 46. The phase of the signal is represented by the numbers along the y-axis (i.e., numbers 0 through 31). These numbers are outputs from the phase register 42 and represent a phase between 0 and $2\pi$. The avediv from the dynamic decrement counter 30 is set up to be equivalent to $2\pi$. The phase register 42 compares the second output 37 of the dynamic decrement counter 30 (i.e., the time between the transitions of the limited signal) to the actual phase of the limited signal 44. This comparison is used as input to the modulo subtractor 46. If the actual phase signal 44 is larger than $2\pi$, a wrapped signal results as shown in FIG. 4. From the phase perspective, the phase signal 44 and the delayed version 47 of the phase signal 44 went beyond the $2\pi$ phase boundary, thus resulting in a "wrapped" signal.

Figure 5:
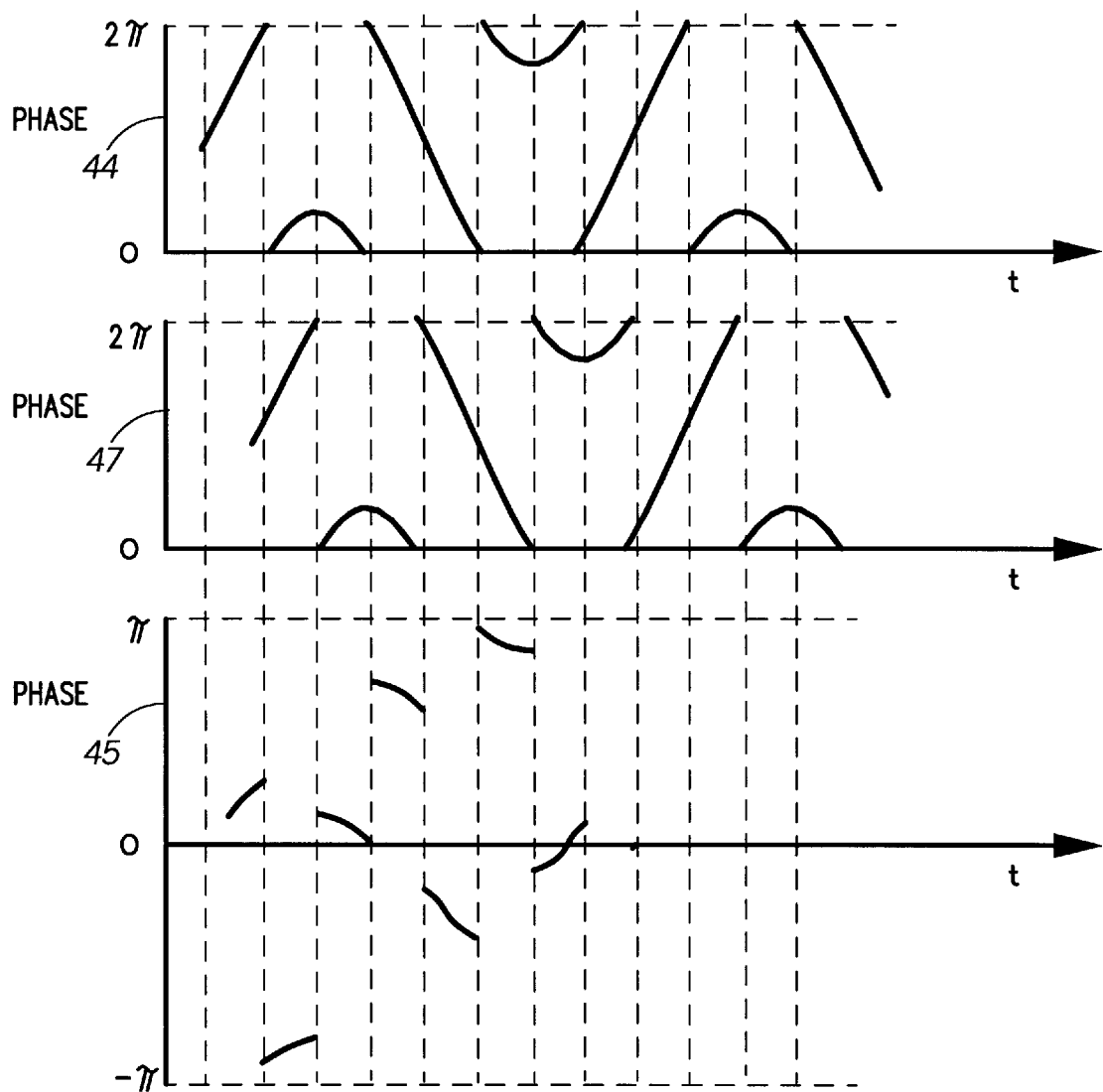
FIG. 5 graphically illustrates the transition of the wrapped signal to a distorted signal.
Figure 6:
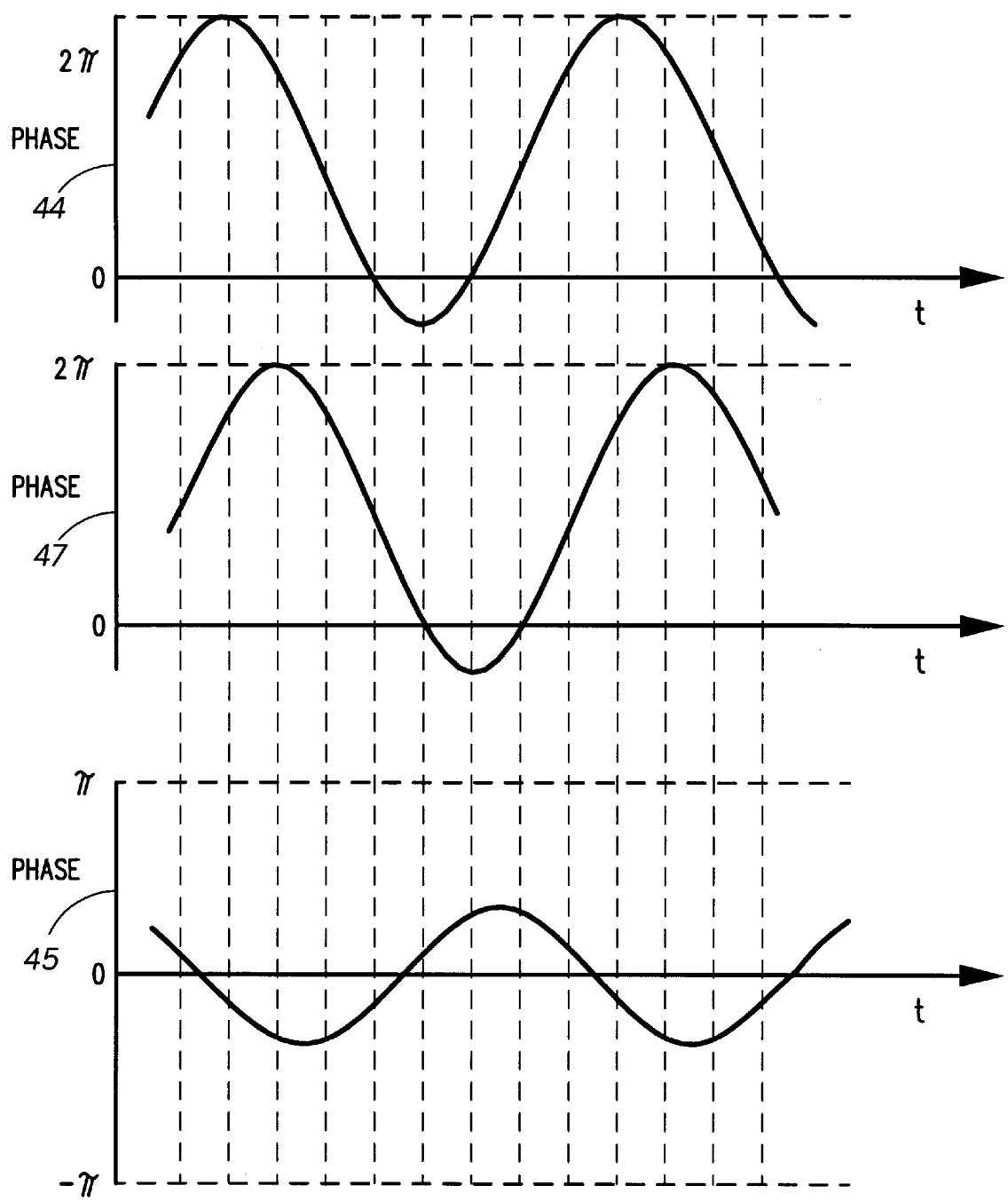
FIG. 6 graphically illustrates an unwrapped signal according to the preferred embodiment of the invention.

In performing the subtraction, if the phase signal 44 and the delayed version 47 of the phase signal 44 are not first "unwrapped", a distorted discriminated radio output 45 will result as shown in FIG. 5. In order to prevent producing such a distorted discriminated radio output 45, the modulo subtractor 46, as applied in the preferred embodiment, "unwraps" both signals 44 and 47 so that a smooth discriminated radio output 45 (e.g., a digital representation of a discriminated radio output) results, as shown in FIG. 6. The modulo subtractor 46 utilizes a non-integer number, based on an average value of the set of at least two integer load values 34 and 36, to unwrap the limited signal.

The modulo subtractor 46 is able to "unwrap" the limited signal so that a smooth digital representation of the discriminated radio output 45 results by determining a modulo value (e.g., 31.5). The modulo value is based on an average of the set of integer load values (avediv). The modulo subtractor 46 adds or subtracts the modulo value from the phase of the limited signal. Preferably, the modulo value is a non-integer number. The modulo subtractor 46 uses that non-integer value (average modulo or avediv) from the dynamic decrement counter 30. As a result, a rational based modulo circuit is produced in accordance with the preferred embodiment of the present invention.

Thus, the magnitude of system degradation between a DPD system incorporating a modulo subtractor using a floating point avediv, as taught in the present invention, and a DPD system incorporating a modulo subtractor 46 using an integer value closest to the avediv are drastically different. The DPD system incorporating a modulo subtractor 46 using a floating point avediv compares well to a reference curve on a bit error rate versus signal-to-noise ratio graph as opposed to yielding at least 1 dB system degradation when the DPD system incorporates a modulo subtractor using an integer value.

While the invention has been described in conjunction with a specific embodiment thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for constructing a digital phase differentiator incorporating a dynamic decrement counter comprising:

sampling a limited signal at a fixed sampling rate;

obtaining a fixed rate for an intermediate frequency of the limited signal;

dividing the fixed sampling rate by a divisor to obtain a frequency of a clock;

dividing the frequency of the clock by the intermediate frequency to obtain a desired average divider;

selecting a set of integer load values that on average yields a non-integer value that is close to the desired average divider; and changing a load value of the dynamic decrement counter cyclically using the set of integer load values.

2. The method according to claim 1 wherein the set of integer load value consists of at least two integer numbers.

3. The method according to claim 1 further comprising:

determining a modulo value based on an average value of the set of integer load values; and unwrapping the limited signal based on the modulo value.

4. The method according to claim 3 wherein the modulo value is a non-integer number.

5. An apparatus of a digital phase differentiator comprising:

a dynamic decrement counter having a reset value input, a first output, a second output and a load value;

a multiplexer, coupled to the reset value input of the dynamic decrement counter, utilizing a set of at least two integer load values;

a state machine, coupled to the first output of the dynamic decrement counter, having a load value output coupled to the reset value input of the dynamic decrement counter via the multiplexer; and a phase register coupled to the second output of the dynamic decrement counter.

6. The apparatus according to claim 5 further comprising a modulo subtractor coupled to an output of the phase register.

7. The apparatus according to claim 6 wherein the modulo subtractor utilizes a non-integer number, derived from taking an average of the set of at least two integer load values, to unwrap a limited signal.

8. The apparatus according to claim 5 wherein a load value of the dynamic decrement counter changes cyclically based on the state machine.

9. The apparatus according to claim 5 wherein the dynamic decrement counter is incremented to a next load state when the dynamic decrement counter reaches zero.

10. The apparatus according to claim 5 wherein the state machine controls a next load state of the dynamic decrement counter.

\* \* \* \* \*